United States Patent
Akutsu

(10) Patent No.: US 9,201,406 B2
(45) Date of Patent: Dec. 1, 2015

(54) INFORMATION PROCESSING APPARATUS, INFORMATION PROCESSING METHOD, AND COMPUTER-READABLE RECORDING MEDIUM STORING A PROGRAM

(71) Applicant: Toru Akutsu, Kanagawa (JP)

(72) Inventor: Toru Akutsu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 385 days.

(21) Appl. No.: 13/680,194

(22) Filed: Nov. 19, 2012

(65) Prior Publication Data

US 2013/0141213 A1 Jun. 6, 2013

(30) Foreign Application Priority Data

Dec. 1, 2011 (JP) .................. 2011-263945

(51) Int. Cl.
G05B 1/01 (2006.01)
G06F 21/60 (2013.01)
G06F 21/34 (2013.01)

(52) U.S. Cl.
CPC *G05B 1/01* (2013.01); *G06F 21/34* (2013.01); *G06F 21/608* (2013.01)

(58) Field of Classification Search
CPC .................. H04L 9/32; G05B 23/00
USPC ............ 340/5.81, 539.13; 726/20, 3; 713/168
See application file for complete search history.

(56) References Cited

U.S. PATENT DOCUMENTS

| 2008/0178265 A1 | 7/2008 | Tsuchiya et al. |
| 2009/0070855 A1 | 3/2009 | Hori et al. |
| 2009/0300757 A1 | 12/2009 | Tanaka et al. |

FOREIGN PATENT DOCUMENTS

| EP | 2 256 657 A1 | 12/2010 |
| EP | 2 336 934 A2 | 6/2011 |
| JP | 2007-141172 | 6/2007 |
| JP | 2008-181491 | 8/2008 |
| JP | 2009-069992 | 4/2009 |
| JP | 2009-182671 | 8/2009 |
| JP | 2009-289164 | 12/2009 |
| JP | 4518287 | 8/2010 |

OTHER PUBLICATIONS

Extended European Search Report dated Aug. 13, 2013.

*Primary Examiner* — Nabil Syed
(74) *Attorney, Agent, or Firm* — IPUSA, PLLC

(57) ABSTRACT

An information processing apparatus includes: a first storage part that stores correspondence information between a first identification information and second identification information; a user identification part that identifies the second identification information corresponding to the first identification information in response to an input of the first identification information; and an authentication request part that requests an authentication to an authentication device connected through a network based on the second identification information identified by the user identification part. The user identification part inquires the authentication device about the corresponding second identification information with respect to the first identification information that is not stored in the first storage part.

15 Claims, 13 Drawing Sheets

FIG.5

| USER NAME | CARD ID |
|---|---|
| – | – |
| – | – |
| – | – |
| – | – |
| – | – |
| : | : |

| SERVER NAME | AUTHENTICATION TYPE | CARD ID ITEM NAME |
|---|---|---|
| XXX.XXX.XXX.001 | LDAP | EMPLOYEE CARD ID |

| USER NAME | PASSWORD | MAIL ADDRESS | ... | EMPLOYEE CARD ID | ... |
|---|---|---|---|---|---|
| user1 | ..... | ..... | ..... | 11111 | ... |
| user2 | ..... | ..... | ..... | 11112 | |
| user3 | ..... | ..... | ..... | 11113 | |
| user4 | ..... | ..... | ..... | 11114 | |
| user5 | ..... | ..... | ..... | 11115 | |
| .. | .. | .. | .. | .. | .. |

| USER NAME | CARD ID | AUTHENTICATION SETTING NUMBER |
|---|---|---|
| user1 | - | 001 |
| user2 | - | 002 |
| user3 | 333333 | 003 |
| user4 | - | 004 |
| user5 | 333334 | 003 |
| : | : | : |

| AUTHENTICATION SETTING NUMBER | SERVER NAME | AUTHENTICATION TYPE | CARD ID ITEM NAME | CARD ID SEARCH | CARD IN CHARGE ID |
|---|---|---|---|---|---|
| 001 | xxx.xxx.xxx.001 | LDAP | EMPLOYEE CARD ID | ON | 11* |
| 002 | xxx.xxx.xxx.002 | LDAP | COMPANY MEMBER NUMBER | ON | 22* |
| 003 | xxx.xxx.xxx.003 | AD | | OFF | — |
| 004 | xxx.xxx.xxx.004 | AD | CARD NUMBER | ON | 44* |

15a

INFORMATION PROCESSING APPARATUS, INFORMATION PROCESSING METHOD, AND COMPUTER-READABLE RECORDING MEDIUM STORING A PROGRAM

BACKGROUND OF THE INVENTION

1. Field of the Invention

The present invention relates to an apparatus and method for performing information processing in an authentication using a card, and a computer-readable recording medium storing a program for causing a computer to perform the information processing.

2. Description of the Related Art

In recent years, many business organizations attempt to maintain security according to a card, such as an employee ID card, given to each employee. For example, an information processing system is constructed so that each employee of a company is required to swipe a card through a card reader at each time he or she enters or leaves a building or a room where he or she works in order to permit only an authenticated person to enter or leave the building or the room.

Moreover, there is an image forming apparatus that can use a card for authenticating a user. The user can get authentication by causing a card reader, which is connected to the image forming apparatus, to read a card ID stored in the user's card.

Correspondence information between a user name and a card ID must be set in the above-mentioned image forming apparatus. This is because such an image forming apparatus identifies the user corresponding to the card ID based on the correspondence information.

However, for a company already introduced a card system for other applications such as, for example, a company security maintenance, etc., it is redundant for an information management system to separately set the correspondence information between a user name and a card ID for authentication by the image forming apparatus.

The following documents relate to the background art of the present invention.

1) Japanese Laid-Open Patent Application No. 2009-289164

2) Japanese Laid-Open Patent Application No. 2009-187559

SUMMARY OF THE INVENTION

It is a general object of the present invention to provide an information processing apparatus and method in which the above-mentioned problem is eliminated.

A more specific object of the present invention is to provide an information processing apparatus and method which can reduce redundancy of information which is to be set for a card authentication.

There is provided according to one aspect of the present invention an information processing apparatus including: a first storage part configured to store correspondence information between a card ID and user identification information; a user identification part configured to identify the user identification information corresponding to the card ID in response to an input of the card ID; and an authentication request part configured to request an authentication to an authentication device connected through a network based on the user identification information identified by the user identification part, wherein the user identification part inquires the authentication device about the corresponding user identification information with respect to the card ID that is not stored in the first storage part.

There is provided according to another aspect of the present invention an information processing method performed by a computer including a first storage part configured to store correspondence information between card ID and user identification information, the information processing method including: a user identification procedure that identifies the user identification information corresponding to the card ID in response to an input of the card ID; and an authentication request procedure that requests an authentication to an authentication device connected through a network based on the user identification information identified in the user identification procedure, wherein the user identification procedure inquires the authentication device about the corresponding user identification information with respect to the card ID that is not stored in the first storage part.

There is provided according to a further aspect of the present invention a non-transitory computer readable recording medium storing a program causing a computer to perform an information processing method, the computer including a first storage part configured to store correspondence information between card ID and user identification information, the information processing method including: a user identification procedure that identifies the user identification information corresponding to the card ID in response to an input of the card ID; and an authentication request procedure that requests an authentication to an authentication device connected through a network based on the user identification information identified in the user identification procedure, wherein the user identification procedure inquires the authentication device about the corresponding user identification information with respect to the card ID that is not stored in the first storage part.

According to the above-mentioned invention, a redundancy of information, which must be set for a card authentication, can be reduced.

Other objects and further features of the present invention will become more apparent from the following detailed description when read in conjunction with the accompanying drawings.

BRIEF DESCRIPTION OF THE DRAWINGS

FIG. 5 is an illustration indicating a structure of a user setting information storage part according to the first embodiment;

FIG. 6 is an illustration indicating a structure of an authentication setting information storage part according to the first embodiment;

FIG. 7 is an illustration indicating a structure of a user information storage part according to the first embodiment;

FIG. 10 is an illustration indicating a structure of a user setting information storage part according to the second embodiment;

FIG. 11 is an illustration indicating a structure of an authentication setting information storage part according to the second embodiment;

DESCRIPTION OF THE PREFERRED EMBODIMENTS

Figure 1:
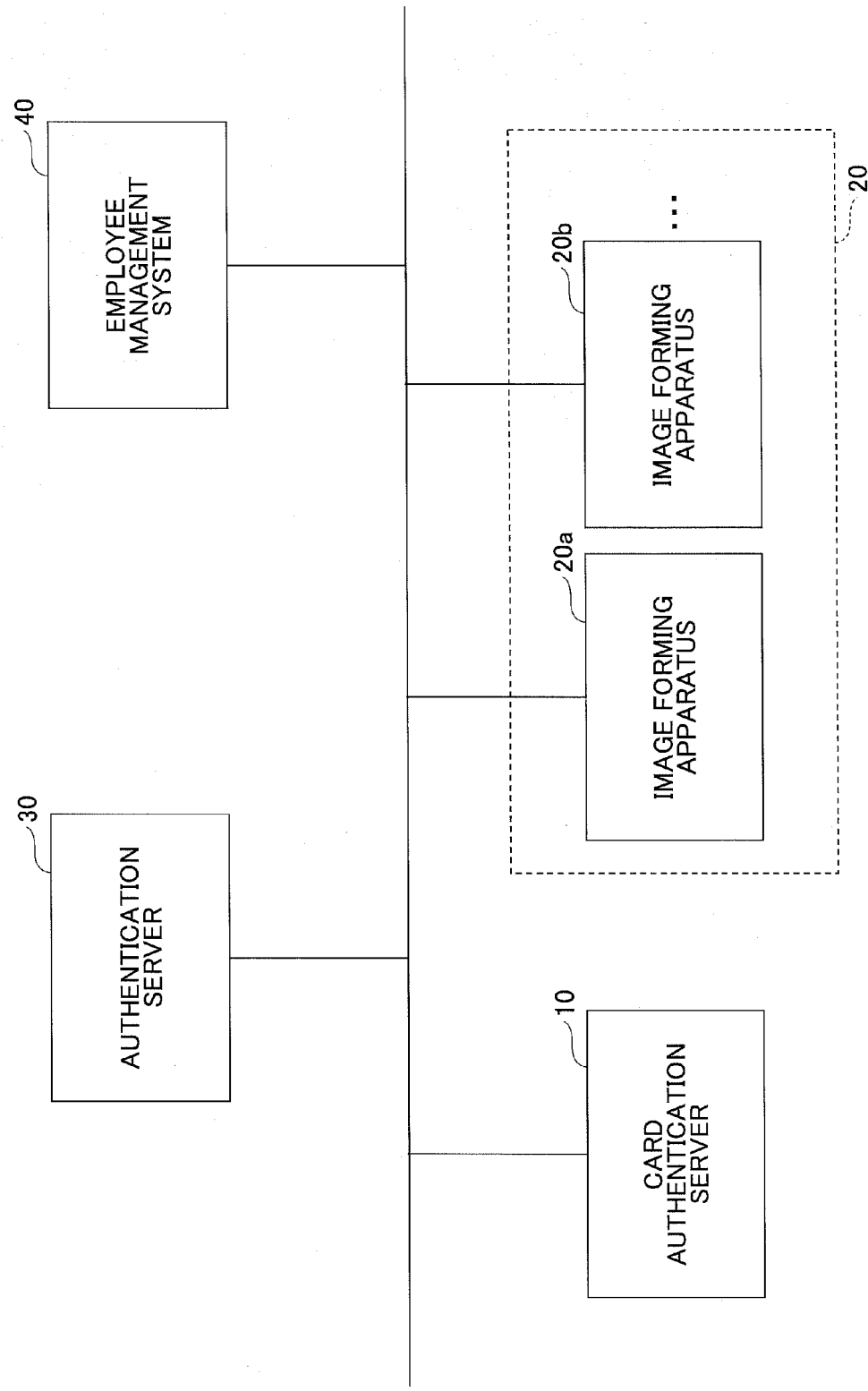
FIG. 1 is a block diagram of a system structure according to a first embodiment.

A description will be given of embodiments of the information processing apparatus and method, and computer-readable storage medium according to the present invention, by referring to the drawings.

FIG. 1 is a block diagram of a system structure according to a first embodiment of the present invention. In FIG. 1, one or more image forming apparatuses 20a, 20b, ... (hereinafter, may be collectively referred to as image forming apparatus 20), and a card authentication server 10 are communicably connected through a network, such as a LAN (Local Area Network) or the Internet. The card authentication server 10 and an authentication server 30 are communicably connected through the network such as a LAN or the Internet. An employee management system 40 and the authentication server 30 are communicably connected through the network such as a LAN or the Internet.

The employee management system 40 is an information processing system, which authenticates an employee according to a card given to the employee in order to permit the authenticated employee to enter or leave a building or a room. The employee management system 40 includes one or more sets of card readers and one or more computers. The authentication processing itself is delegated to the authentication server 30. For example, the employee management system 40 inquires of the authentication server 30 about the user name corresponding to the card ID read from the card by the card reader.

When the user name is returned from the authentication server 30 in response to the inquiry, the employee management system 40 assumes that the employee associated with the card concerned is authenticated. The card may be of a contact type or a non-contact type, and may be an IC card or a magnetic card. That is, the card can be any one which can store at least a card ID. The card ID is identification information of each card, such as, for example, a Universal ID, a Card Serial Number, etc.

The authentication server 30 is a computer, which performs authentication processing based on a user name. The authentication server 30 is shared by various kinds of information processing systems in an organization such as a company, etc. In the present embodiment, the authentication server 30 stores correspondence information between a user name and a card ID of each employee in association with the employee management system 40.

The image forming apparatus 20 having a single housing achieves two or more functions from among a print function, a scan function, a copy function, and a facsimile transmission and reception function. However, an apparatus having only one of the functions may be used as the image forming apparatus 20. A card reader (not illustrated in the figure) for reading a card ID from a card is connected to the image forming apparatus 20. The read card ID is used for a card authentication. The card authentication means an authentication function using a card which stores identification information.

The card authentication server 10 is a computer, which receives an authentication request containing a card ID from the image forming apparatus 20, and controls authentication processing based on the received card ID. Essentially, the card authentication server 10 stores correspondence information between a user name and a card ID, and converts the card ID contained in the authentication request from the image forming apparatus 20 into a user name be using the correspondence information. The card authentication server 10 transmits an authentication request based on the user name after conversion to the authentication server 30.

However, in the present embodiment, the card authentication server 10 creates the correspondence information between the user name and the card ID of each employee in association with the employee management system 40. Thereby, in an environment where one set of correspondence information between a user name and a card ID has already been created for the purpose or application different from the card authentication performed by the image forming apparatus 20, a possibility of setting different correspondence information between a user name and a card ID to the card authentication server 10 is reduced.

Figure 2:
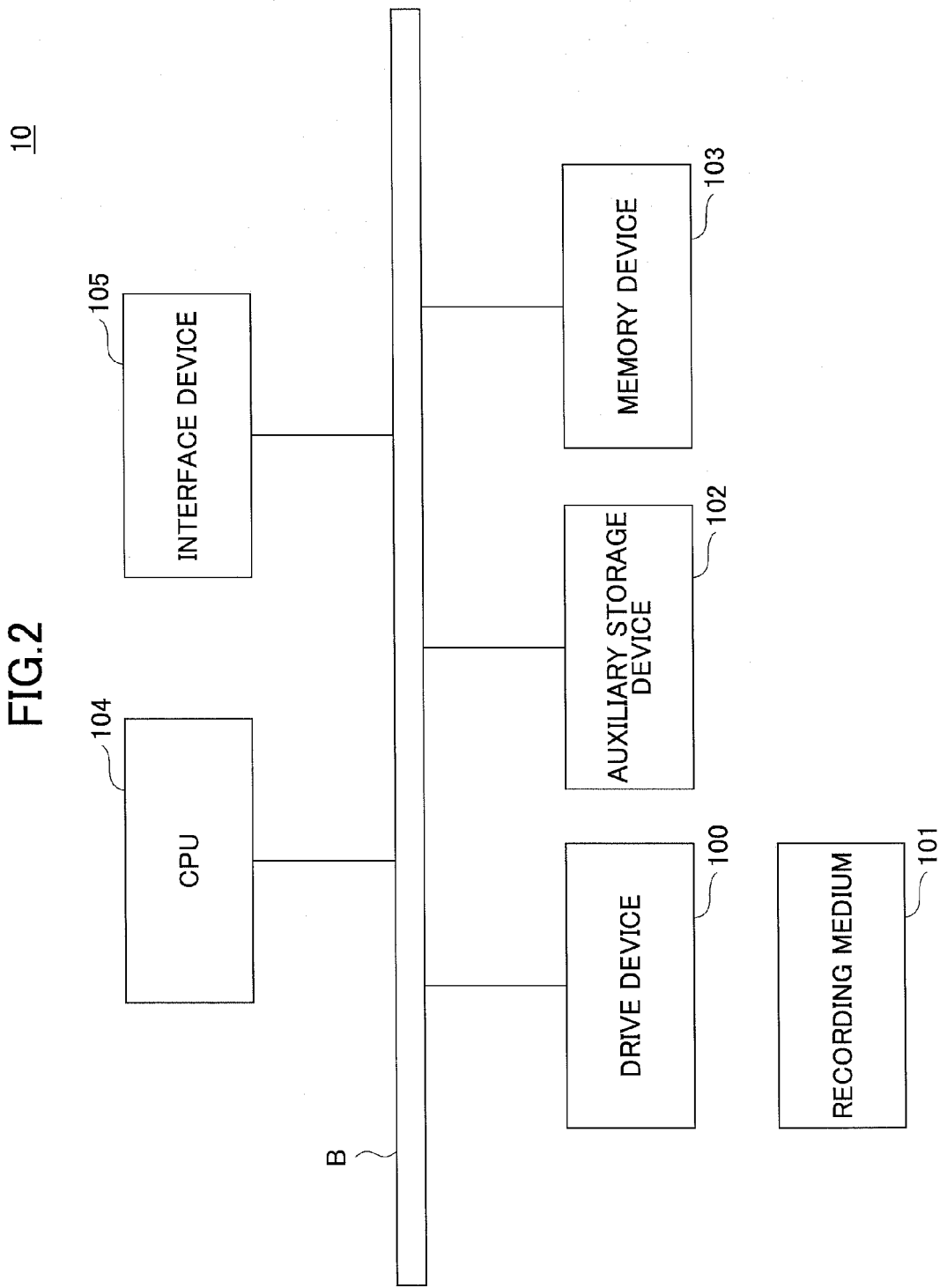
FIG. 2 is a block diagram of a hardware structure of a card authentication server according to the first embodiment.

FIG. 2 is a block diagram of a hardware structure of the card authentication server according to the first embodiment. The card authentication server 10 illustrated in FIG. 2 includes a drive device 100, an auxiliary storage device 102, a memory device 103, a CPU 104, an interface device 105, etc., that are mutually connected by a bus B.

A program realizing processing performed by the card authentication server 10 is provided by a computer-readable recording medium 101 such as a CD-ROM. When a recording medium 101 on which the program is recorded is set in the drive device 100, the program is read from the recording medium 101 by the drive device 100 and is installed in the auxiliary storage device 102. However, it is not necessary to acquire the program from a recording medium 101, and the program may be downloaded from other computers through a network. The auxiliary storage device 102 stores the installed program and also stores necessary files and data.

When an instruction of initiating the program is received, the memory device 103 reads the program from the auxiliary storage device 102 and stores the program therein. The CPU 104 performs functions associating with the card authentication server 10 in accordance with the program stored in the memory device 103. The interface device 105 is used as an interface for connecting to a network.

In addition, each of the authentication server 30 and the image forming apparatus 20 has the same hardware structure as that illustrated in FIG. 2. However, the image forming apparatus 20 has a further hardware structure peculiar to an image forming process.

Figure 3:
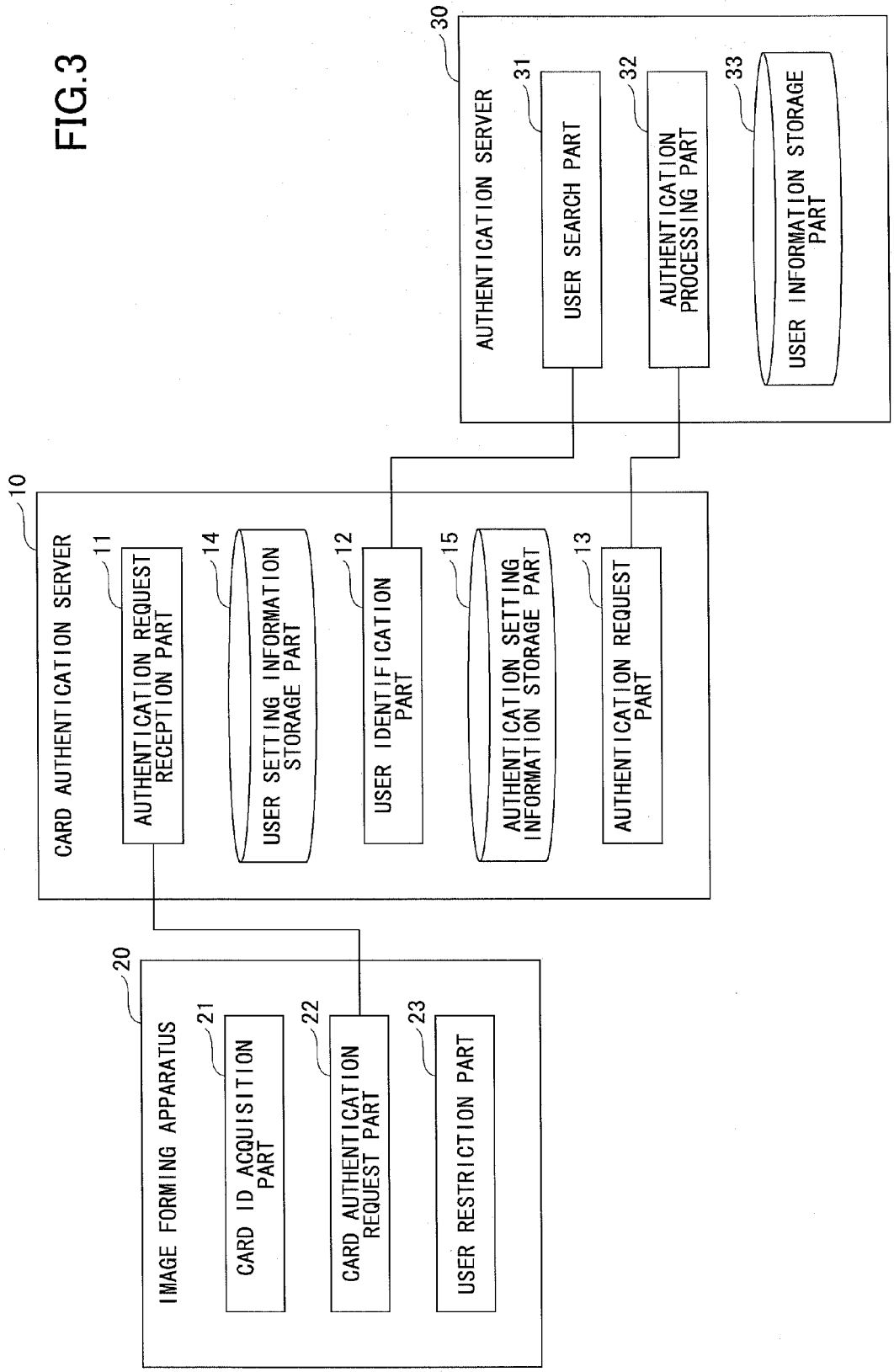
FIG. 3 is a block diagram of a functional structure of each apparatus according to the first embodiment.

FIG. 3 is a block diagram of a functional structure of each apparatus according to the first embodiment. In FIG. 3, the image forming apparatus 20 includes a card ID acquisition part 21, a card authentication request part 22, and a use restriction part 23. Each of those parts is realized by a process, which is performed by the CPU of the image forming apparatus 20 executing the program installed in the image forming apparatus 20.

The card ID acquisition part 21 acquires a card ID from a card set in the card reader of the image forming apparatus 20. The card authentication request part 22 transmits an authentication request (a card authentication request) in which a card ID is specified to the card authentication server 10. The use restriction part 23 restricts use of the function of the image forming apparatus 20 by a user based on an authentication result returned from the card authentication server 10 in response to the card authentication request.

The card authentication server 10 includes an authentication request reception part 11, a user identification part 12, and an authentication request part 13. Each of those parts is realized by a process, which is performed by the CPU 104 executing the program installed in the card authentication server 10. The card authentication server 10 also uses a user setting information storage part 14 and an authentication setting information storage part 15. Each of those storage parts is realizable using the auxiliary storage device 102 or a storage device connected to the card authentication server 10 through a network.

The authentication request reception part 11 receives the card authentication request from the image forming apparatus 20. The user identification part 12 identifies identification information of the user corresponding to the card ID specified in the card authentication request. In the present embodiment, a user name is used as the identification information of the user. The authentication request part 13 transmits to the authentication server 30 an authentication request based on the user name identified by the user identification part 12.

The user setting information storage part 14 stores the correspondence information between the user and the card ID for using in the card authentication. The authentication setting information storage part 15 stores information regarding the authentication server 30.

The authentication server 30 includes a user search part 31 and an authentication processing part 32. Each of those parts is realized by a process, which is performed by a CPU of the authentication server 30 executing the program installed in the authentication server 30. The authentication server also uses a user information storage part 33. The user information storage part 33 is realizable using an auxiliary storage device which the authentication server 30 has, or using a storage device connected to the authentication server 30 through a network.

The user search part 31 retrieves the user name corresponding to the card ID from the user information storage part 33. The authentication processing part 32 performs authentication processing based on the user name using the user information storage part 33. The user information storage part 33 stores attribute information of each user.

Figure 4:
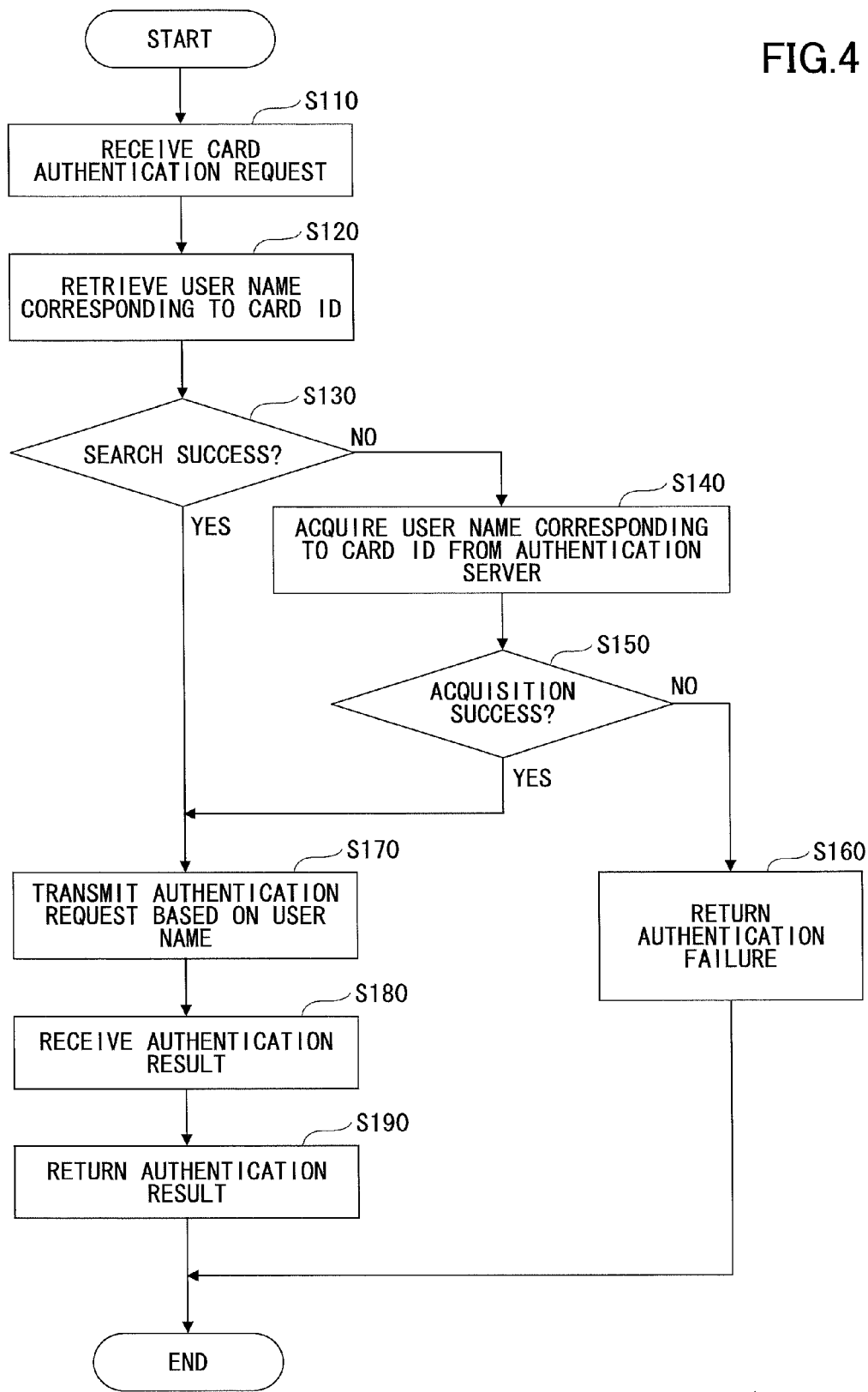
FIG. 4 is a flowchart for explaining a process procedure of a card authentication process according to the first embodiment.

A description will be given below of a process procedure principally performed by the card authentication server 10. FIG. 4 is a flowchart for explaining a process procedure of a card authentication process according to the first embodiment.

In step S110, the authentication request reception part 11 receives the card authentication request transmitted from the card authentication request part 22 of the image forming apparatus 20. A card ID is specified in the card authentication request. The card ID is acquired from a card of a user by the card ID acquisition part 2 when the card of the user is set to the card reader of the image forming apparatus 20. The setting of the card to the card reader means setting the card reader in a state where the card reader can read information recorded on the card such as inserting the card to the card reader or swiping the card through the card reader.

The user sets the card used in the employee management system 40 to the card reader of the image forming apparatus 20. That is, in the present embodiment, the card used in the employee management system 40 is usable as a card for the card authentication performed by the image forming apparatus 20.

Then, the user identification part 12 retrieves the user name corresponding to the card ID specified in the card authentication request from the user setting information storage part 14 (step S120).

FIG. 5 is an illustration of a structure of the user setting information storage part according to the first embodiment. As illustrated in FIG. 5, the user setting information storage part 14 is configured to store a card ID by associating with a user name. However, in the present embodiment, a user name and a card ID are not set to the user setting information storage part 14. Accordingly, the retrieval of the user name corresponding to the card ID is failed.

When the retrieval of the user name corresponding to the card ID is failed (NO of step S130), the user identification part 12 tries an acquisition of the user name corresponding to the card ID from the authentication server 30 (step S140). Specifically, the user identification specification part 12 sends to the authentication server 30 a search request of the user name corresponding to the card ID concerned. When sending the search request, the user identification part 12 specifies the authentication server 30 and a sending method of the search request by referring to the authentication setting information storage part 15.

FIG. 6 is an illustration of a structure of the authentication setting information storage part according to the first embodiment. As illustrated in FIG. 6, the authentication setting information storage part 15 stores information regarding a server name, an authentication type and a card ID item name.

The server name is identification information, such as a host name or an IP address of the authentication server 30, used for establishing a communication with the authentication servers 30. The authentication type indicates a protocol used in the communication with the authentication server 30. In the example illustrated in FIG. 6, the authentication type is set to an LDAP (Lightweight Directory Access Protocol). Therefore, it is appreciated that the communication with the authentication server 30 is performed according to the LDAP. The card ID item name is a name of an item in which the card ID is stored. In the example of FIG. 6, the card ID item name is set to "employee card ID". Therefore, it is appreciated that the card ID is stored in the item having the name "employee card ID" in the user information storage part 33.

The user identification part 12 identifies the authentication server 30 according to the server name stored in the authentication setting information storage part 15, and also identifies a method of transmitting the search request of the user name according to the authentication type and the card ID item name. That is, character strings representing the card ID and the card ID item name are specified in the search request, and the search request is transmitted according to the LDAP.

The user search part 31 of the authentication server 30 retrieves the user name corresponding to the card ID from the user information storage part 33 in response to the reception of the search request.

FIG. 7 is an illustration of a structure of the user information storage part according to the first embodiment. As illustrated in FIG. 7, the user information storage part 33 stores attribute information such as a user name, a password, a mail address, and an employee card ID for each employee. The user name and the password are used for logging in to various kinds of information processing system in an organization. The employee card ID is registered by being caused to correspond to each user name in association with the employee management system 40.

The user search part 31 retrieves from the user information storage part 33 a record to which a value matching the card ID specified in the search request is set in the item (employee card ID) indicated by the card ID item name specified in the search request of the user name. When the record is retrieved, the user search part 31 returns a response containing the user name of the record to the user identification part 12. If the record is not retrieved, the user search part 31 returns a response indicating a failure of the retrieval to the user identification part 12.

As explained above, the relationship between the card authentication server 10 and the authentication server 30 can be set in a dynamic relationship according to the authentication type and the card ID item name being set in the authentication setting information storage part 15. As a result, even in a case where the protocol used by the authentication server 30 or the structure of the user information storage part 33 is changed, the card authentication server 10 and the authentication server 30 can be easily set to be communicable with each other. It should be noted that the authentication type and the card ID item name are examples of a parameter necessary for setting the relationship between the card authentication server 10 and the authentication server 30 to a dynamic relationship. Therefore, other parameters may be stored in the authentication setting information storage part 15.

If the response which indicates a failure in the retrieval by the user search part 31 is returned, that is, if the acquisition of the user name is failed (NO of step S150), the authentication request reception part 11 returns a response indicating a failure in the card authentication to the image forming apparatus 20 (step S160).

If the response containing the user name is returned from the user search part 31 (YES of step S150), the authentication request part 13 transmits an authentication request in which the acquired user name is specified to the authentication server 30 (step S170). The authentication processing part 32 of the authentication server 30 searches the user information storage part 33 for the user name specified in the authentication request in response to the reception of the authentication request. If the user name concerned is retrieved, the authentication processing part 32 returns a response indicating a success of the authentication to the authentication request part 13. On the other, if the user name concerned is not retrieved, the authentication processing part 32 returns a response indicating a failure of the authentication to the authentication request part 13.

The authentication request part 13 receives the response returned from the authentication processing part 32 (step S180). It should be noted that the communication procedure between the authentication request part 13 and the authentication processing part 32 in steps S170 and S180 follows the authentication type stored in the authentication setting information storage part 15.

The authentication request reception part 11 returns to the image forming apparatus 20 an authentication result (information indicating success or failure of an authentication) included in the response concerned (step S190).

Generally, an authentication is performed by collating a user name and a password. However, in the first embodiment, the authentication is performed by checking whether the user name is stored in the user information storage part 33 in order to save the effort of inputting the password by a user. In this case, if the card is transferred to a stranger, there may be a possibility of unauthorized use of the card. However, the authentication according to a user name alone is effective in an environment in which the card is strictly managed and a priority is given to saving the effort of inputting a password.

Moreover, in the present embodiment, because both the acquisition place from which the user name corresponding to the card ID is acquired and the request place of requesting the authentication based on the user name are in the same authentication servers 30, the success or failure of the card authentication may be judged according to the success or failure of acquisition of the user name corresponding to the card ID. That is, the process of steps S170 and S180 is a redundant process. However, if the correspondence information between a card ID and a user name is managed in the computer constituting the employee management system 40, the process of steps S170 and S180 becomes a significant process. In such a case, the user identification part 12 of the card authentication server 10 sets the acquisition place of the user name corresponding to the card ID in the computer constituting the employee management system 40.

On the other hand, if the retrieval of the user name corresponding to the card ID in step S120 is successful (YES of step S130), the process of step S170 and subsequent steps is performed using the retrieved user name.

Upon reception of the result of the card authentication returned in step S160 or S190, the use restriction part 23 of the image forming apparatus 20 performs a process control in accordance with the returned result. For example, if the result of the card authentication indicates a failure, the use restriction part 23 restricts use of all or a part of the functions of the image forming apparatus 20.

As mentioned above, according to the first embodiment, the card authentication of the image forming apparatus 20 can be performed using the card ID managed for a purpose different from the card authentication of the image forming apparatus 20. Therefore, the necessity of separately setting the correspondence information to the user setting information storage part 14, which stores the correspondence information between the user name and the card ID for the purpose of a card authentication, can be reduced. As a result, the effort of setting the correspondence information can be saved. Moreover, redundancy due to duplicate management of the same correspondence information can be omitted, and troublesome maintenance tasks can be avoided.

A description will be given below of a second embodiment. In the second embodiment, a description is given of points different from the first embodiment. Accordingly, it should be interpreted that points which are not referred to in the following description are the same as that of the first embodiment.

Figure 8:
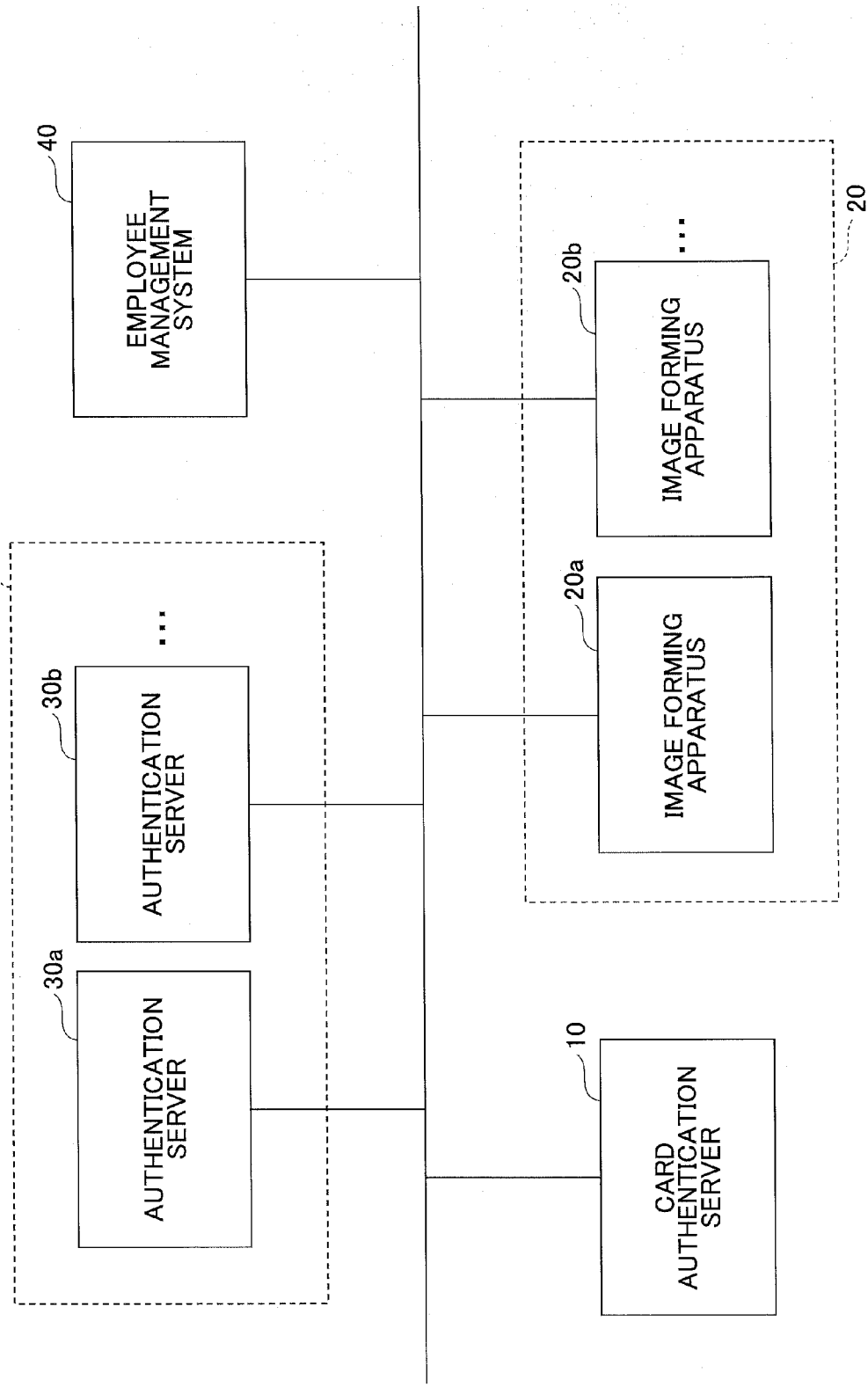
FIG. 8 is a block diagram of a system structure according to a second embodiment.

FIG. 8 is a block diagram of a system structure according to the second embodiment. In FIG. 8, parts that are the same as the parts illustrated in FIG. 1 are given the same reference numerals, and descriptions thereof will be omitted.

As illustrated in FIG. 8, in the second embodiment, a plurality of authentication servers 30a, 30b, . . . are installed. Hereinafter, each of the authentication servers 30a, 30b, . . . may be referred to as an authentication server 30. Although the fundamental function of each authentication server 30 is the same, users who can be authenticated by the authentication servers 30 are different from each other. For example, an authentication of a user A is performed by the authentication server 30a, and an authentication of a user B is performed by the authentication server 30b. Moreover, the authentication server 30a may use an LDAP (Lightweight Directory Access Protocol), and the authentication server 30b may use an active directory. That is, the communication protocol and the structure (scheme) of the user information storage part 33 used by the authentication servers 30 may differ from one server to another server.

As an example of a situation where a plurality of authentication servers 30 are installed, there is a case of merger and acquisition of companies and interdepartmental integration. For example, on the assumption that the authentication server 30a is an authentication server 30 in association with employees of a company A before merge, and the authentication server 30b is an authentication server 30 in association with employees of a company B before merge, there may be a case where the plurality of authentication servers 30a and 30b are continuously used after merge because it requires a labor to integrate the authentication servers 30a and 30b.

Figure 9:
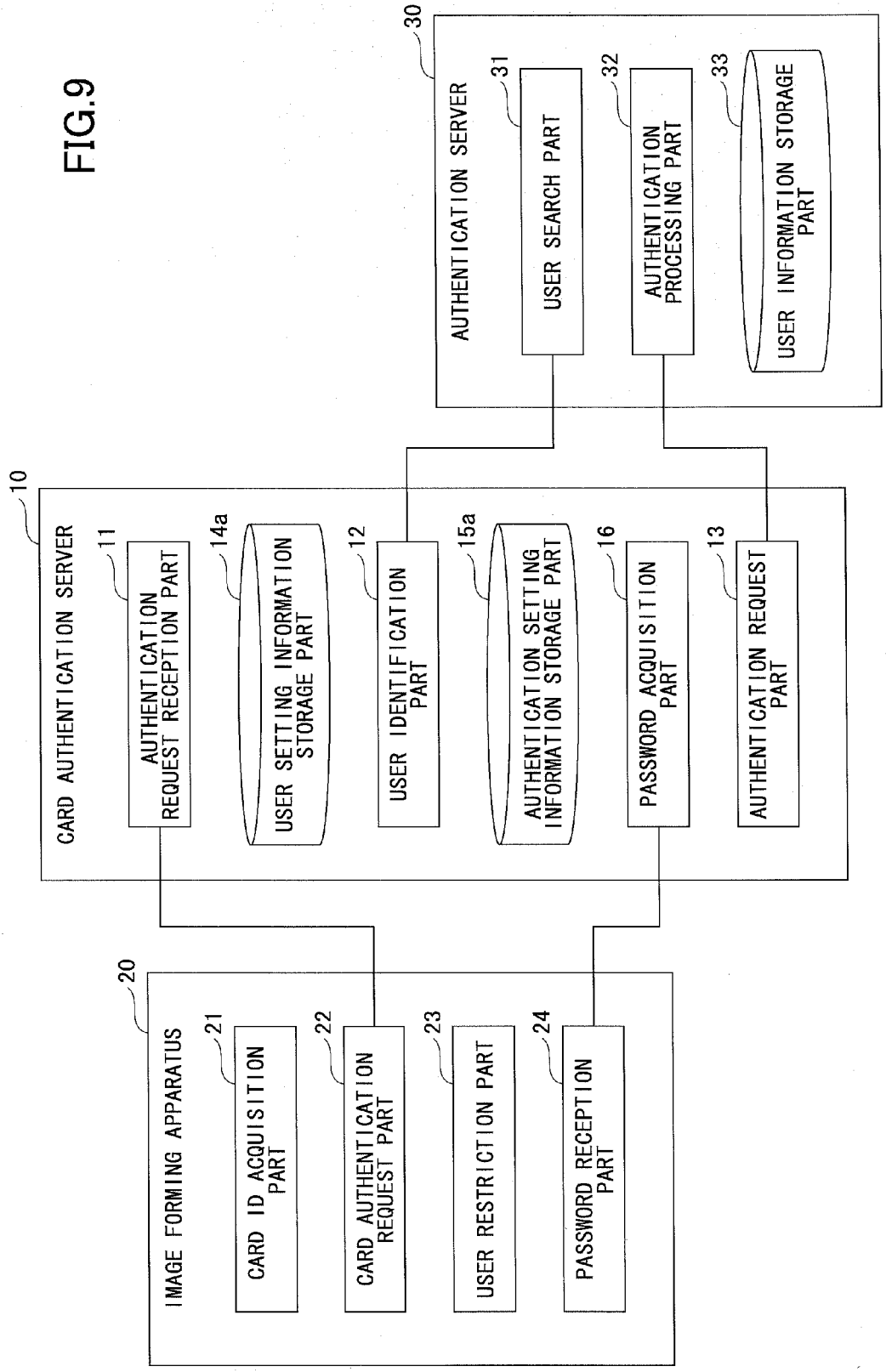
FIG. 9 is a block diagram of a functional structure of each device according to the second embodiment.

FIG. 9 is a block diagram of a functional structure of each apparatus according to the second embodiment. In FIG. 9, parts that are the same as the parts illustrated in FIG. 3 are given the same reference numerals, and descriptions thereof will be omitted.

In FIG. 9, the image forming apparatus 20 further includes a password reception part 24. The password reception part 24 receives an input of a password from a user through an operation panel of the image forming apparatus 20. That is, in the second embodiment, the setting of the card to the card reader and the input of a password are required to a user.

The card authentication server 10 further includes a password acquisition part 16. The password acquisition part 16 acquires a password input in the image forming apparatus 20 by requesting a transmission of the password to the password reception part 24.

Moreover, a user setting information storage part 14a and an authentication setting information storage part 15a of the second embodiment have structures as illustrated in FIG. 10 and FIG. 11, respectively.

FIG. 10 is an illustration indicating a structure of the user setting information storage part according to the second embodiment. In the second embodiment, the user setting information storage part 14a further stores an authentication setting number for each user. The authentication setting number is an identification number, which is applied to each user to identify a record of the authentication setting information storage part 15a.

FIG. 11 is an illustration indicating a structure of the authentication setting information storage part of the second embodiment. In the second embodiment, because a plurality of authentication servers 30 are installed, the authentication setting information storage part 15a stores a record for each authentication server 30. Each record includes an authentication setting number, a card ID search, and a card in charge ID in addition to a server name, an authentication type, and a card ID item name.

The authentication setting number is an identification number of each record. The card ID search is information indicating whether the authentication server 30 associated with the record concerned stores (ON) or does not store (OFF) a user name in association with the card ID. All or a part of the card ID can be specified in the card in charge ID. Specifically, an arbitrary part of the card in charge ID may be specified using a wild card ("*" or "?"). Moreover, a range designation such as "11111-12000" may be set to the card in charge ID. Further, more than one card ID may be listed. It should be noted that the card ID and the card in charge ID are effective with respect to the authentication server 30 of which card ID search is set to "ON". Moreover, "AD" in the authentication type of FIG. 11 indicates an active directory.

Figure 12:
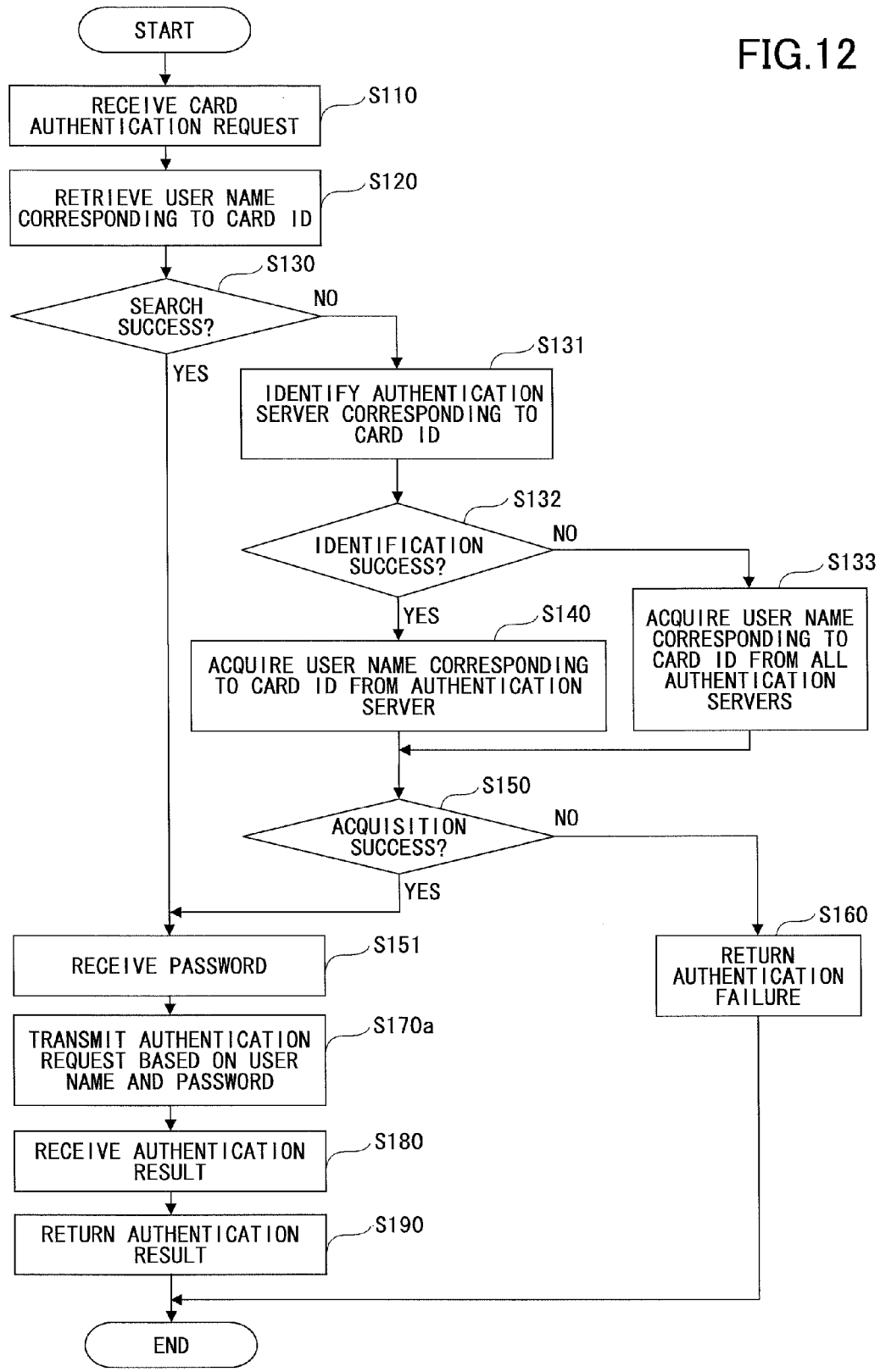
FIG. 12 is a flowchart for explaining a process procedure of a card authentication process according to the second embodiment.

A description is given below of a card authentication process according to the second embodiment. FIG. 12 is a flowchart for explaining a process procedure of a card authentication process according to the second embodiment. In FIG. 12, steps that are the same as the steps illustrated in FIG. 4 are given the same step numbers, and descriptions thereof will be omitted.

In FIG. 12, if a retrieval of the card ID from the user setting information storage part 14a fails (NO of step S130), the user identification part 12 identifies the authentication server 30 corresponding to the card ID concerned by referring to the authentication setting information storage part 15a (FIG. 11) (step S131). That is, the user identification part 12 searches the authentication setting information memory part 15a for a record of which value of the card in charge ID matches the card ID concerned to acquire the server name of the record concerned.

If the corresponding record is not retrieved, that is, if the identification of the authentication server 30 corresponding to the ID card concerned is failed (NO of step S132), the user identification part 12 tries to acquire the user name corresponding to the card ID concerned from all of the authentication servers 30 of which card ID is "ON" (step S133).

On the other hand, if the corresponding record is retrieved, that is, if the identification of the authentication server 30 corresponding to the card ID is in success (YES of step S132), the user identification part 12 tries to acquire the user name corresponding to the record concerned by the authentication server 30 identified by the server name of the record concerned.

If the acquisition of the user name from the authentication server 30 is in success (YES of step S150), the process of step S151 and the subsequent steps is performed. It should be noted that when the acquisition of the user name is tried with respect to all of the authentication servers 30 of which the card ID search is set to "ON", it is regarded that the acquisition of the user name is successful if the user name is acquired from any one of the authentication servers 30.

In step S151, the password acquisition part 16 acquires the password input in the image forming apparatus 20 by a transmission request of the password to the image forming apparatus 20. Namely, the password reception part 24 of the image forming apparatus 20 displays an input screen of the password on the operation panel of the image forming apparatus 20 in response to the transmission request of the password. When the password is input by the user, the password reception part 24 returns the input password to the password acquisition part 16.

Then, the authentication request part 13 transmits an authentication request in which the acquired user name and the acquired password are specified to the authentication server 30 (step S170a). The transmitting authentication server 30 which transmits the authentication request is, if the determination of step S130 is negative "NO", the authentication server 30 that has been identified in step S130, or the authentication server 30 that has been successful in acquisition of the user name in step S133. If the determination of step S130 is positive "YES", the transmitting authentication server 30 is the authentication server 30, which is in association with a record of the authentication setting information storage part 15 that corresponds to the authentication setting number of the record retrieved by the user setting information storage par 14 in step S120.

The authentication processing part 32 of the authentication server 30 searches the user information storage part 33 for a record, which matches the user name and the password specified in the authentication request, in response to the reception of the authentication request concerned. If the corresponding record is retrieved, the authentication processing part 32 returns a response, which indicates a success in the authentication, to the authentication request part 13. If the corresponding record is not retrieved, the authentication processing part 32 returns a response, which indicates a failure in the authentication, to the authentication request part 13.

As mentioned above, according to the second embodiment, the card authentication can be appropriately performed even in a case where a plurality of the authentication servers 30 are installed and users who are managed by the authentication servers 30 are different from each other.

Although the input of a password is required in the second embodiment, there is no particular dependency between the installation of the plurality of authentication servers 30 and the input of a password. The purpose of inputting a password in the second embodiment is to indicate a variation of the authentication based on a user name in the first embodiment. Accordingly, the input of a password may be omitted in the second embodiment, or an input of a password is performed in the first embodiment.

A description is given below of a third embodiment. In the third embodiment, a description is given of points different from the second embodiment. Thus, points that are not explained below are the same as the second embodiment.

Figure 13:
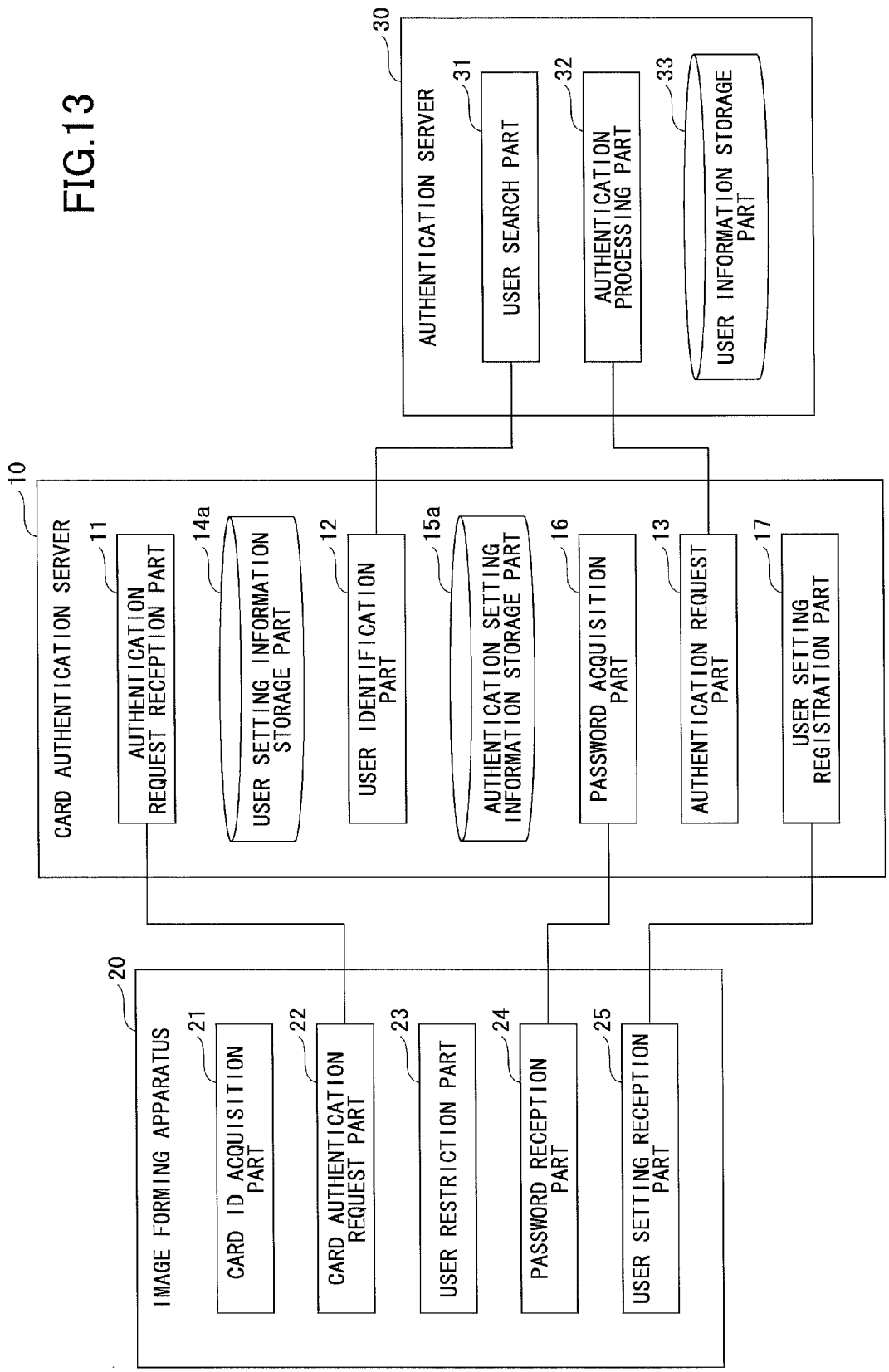
FIG. 13 is a block diagram of a functional structure of each device according to the a third embodiment.

FIG. 13 is a block diagram of a functional structure of each apparatus according to the third embodiment. In FIG. 13, parts that are the same as the parts illustrated in FIG. 9 are given the same reference numerals, and descriptions thereof will be omitted.

In FIG. 13, the image forming apparatus 20 further includes a user setting reception part 25. The user setting reception part 25 receives an input of the information (user setting information) stored in the user setting information storage part 14 through, for example, the operation panel of the image forming apparatus 20.

The card authentication server 10 further includes a user setting registration part 17. The user setting registration part 17 registers the user setting information received by the user setting reception part 25 in the user setting information storage part 14.

Figure 14:
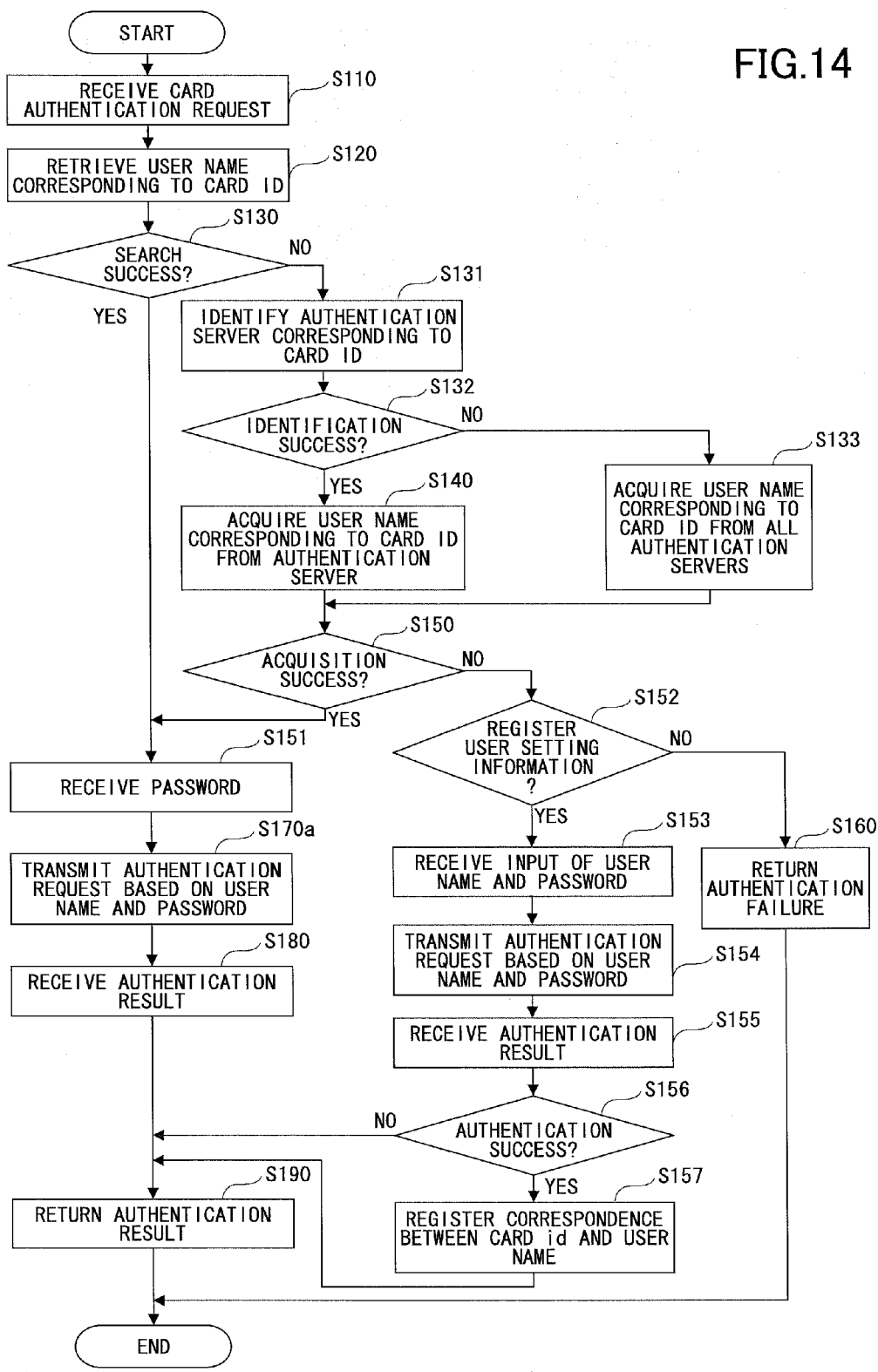
FIG. 14 is a flowchart for explaining a process procedure of a card authentication process according to the third embodiment.

A description will be given below of a card authentication process according to the third embodiment. FIG. 14 is a flowchart for explaining a process procedure of the card authentication process according to the third embodiment. In FIG. 14, steps that are the same as the steps illustrated in FIG. 12 are given the same reference numerals, and descriptions thereof will be omitted.

In FIG. 14, if the acquisition of the user name from the authentication server 30 is failed (NO of step S150), the user setting registration part 17 inquires the user setting reception part 25 of the image forming apparatus 20 whether to register the user setting information (step S152). The user setting reception part 25 causes the operation panel to display a screen to select registration or non-registration of the user setting information with respect to the user who is operating the image forming apparatus 20. The user setting reception part 25 returns information, which indicates a result of selection by the user through the screen, to the user setting registration part 17.

If the result of selection by the user indicates that the registration of the user setting information is not needed (NO of step S152), the authentication request reception part 11 returns a response indicating a failure in the card authentication to the image forming apparatus 20 (step S160).

If the result of selection by the user indicates that the registration of the user setting information is needed (YES of step S152), the user setting registration part 17 receives an input of the user name and the password from a user through the user setting reception part 25 of the image forming apparatus 20. Specifically, the user setting registration part 17 transmits a transmission request of a user name and a password to the user setting reception part 25. In response to the transmission request, the user setting reception part 25 causes the operation panel of the image forming apparatus 20 to display an input screen of a user name and a password. The user setting reception part 25 returns the user name and the password, which are input by the user through the input screen, to the user setting registration part 17.

An authentication setting number or a server name of the authentication server 30 may be input together with a user name and a password. The authentication setting number or the server name may be input as a separate item, or may be input subsequent to the use name such as, for example, "<user name>:<authentication setting number or server name>".

Then, the user setting registration part 17 transmits the authentication request in which the user name and the password are specified to the authentication server 30 (step S154). If the authentication setting number or the server name is input together with a user name and a password, a transmission place to which the authentication request is transmitted is the authentication server 30, which is associated with the authentication setting number and the server name. On the other hand, if the authentication setting number or the serve name is not input when the user name and the password are input, the transmission place to which the authentication request is transmitted is, for example, all of the authentication servers 30.

The authentication processing part 32 of the authentication server 30, which receives the authentication request, performs a process the same as is performed in response to step S170a to return the authentication result. The user setting registration part 17 receives the authentication result concerned (step S155). If the authentication result indicates a success in the authentication (YES of step S156), the user setting registration part 17 registers into the user setting information storage part 14 a record containing the user name input in step S153 and the card ID received in step S110 (S157). In this situation, if the authentication setting number or a server name is input together with the user name and the password, the authentication setting number or an authentication setting number corresponding to the server name is registered in the record. If an authentication setting number or a server name is not input when the user name and the password is input, the authentication setting number corresponding to the authentication server 30, of which authentication is in success in step S155, is registered in the record.

The process of step S190 is performed subsequent to the process of step S157.

On the other hand, if the authentication result returned from the authentication server 30 indicates a failure in the authentication (NO of step S156), a registration of the user name and the card ID is not performed but the process of step S190 is performed.

As mentioned above, according to the third embodiment, the correspondence information between the user name and the card ID is registered in the user setting information storage part 14 with respect to a user whose card IC is not registered in any one of the authentication server 30. Accordingly, if the user desires to use the image forming apparatus 20 thereafter, the user can use the image forming apparatus 20 by performing setting of the card to the card reader and inputting the password. Moreover, because the user name and the card ID can be done by a user, the necessity of collectively registering user names and passwords by a management person can be reduced. Further, because the registration of a user name and a card ID is performed only in the case where the authentication is in success, security can be maintained even if the registration is not performed by the management person.

The image forming apparatus 20 have been described as an example of an information processing apparatus, which becomes available by a card authentication in the above mentioned embodiment. However, each of the above mentioned embodiments may be achieved by replacing the image forming apparatus 20 by an information processing apparatus, which can perform a card authentication, other than the image forming apparatus 20.

Moreover, the function of the card authentication server 10 may be mounted to the image forming apparatus 20. In such a case, the card authentication server 10 may not be installed.

In addition, in the above-mentioned embodiments, the user setting information storage part 14 is an example of a first storage part, and the authentication setting information storage part 15 is an example of a second storage part. Additionally, the user setting registration part 17 is an example of a registration part.

Although the embodiments are numbered with, for example, "first" or "second", the ordinal numbers do not imply priorities of the embodiments. Many other variations and modifications will be apparent to those skilled in the art.

Although the information processing apparatus and the information processing method have been described according to the embodiments, the present invention is not limited to the specifically disclosed embodiments, and variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitable programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a flexible magnetic disk, hard disk, CD-ROM, magnetic tape device or solid state memory device. The hardware platform includes any desired hardware resources including, for example, a central processing unit (CPU), a random access memory (RAM) and a hard disk drive (HDD). The CPU can be constituted by any desired kinds and number of processors. The RAM can be constituted by any desired volatile or non-volatile memories. The HDD can be constituted by any desired non-volatile memories that can record a large amount of data. The hardware resources may be further equipped with an input device, an output device or a network device depending on a type of the apparatus. The HDD may be outside the apparatus as long as it can be accessed. In this example, CPU and RAM as a cache memory of the CPU may serve as a physical memory or a main memory of the apparatus, and, on the other hand, HDD may serve as a secondary memory of the apparatus.

The present invention is based on Japanese priority application No. 2011-263945 filed on Dec. 1, 2011, the entire contents of which are hereby incorporated herein by reference.

What is claimed is:

1. An information processing apparatus comprising:
a first storage part configured to store correspondence information between first identification information and second identification information;
a user identification part configured to identify the second identification information corresponding to the first identification information in response to an input of the first identification information;
an authentication request part configured to request an authentication to an authentication device connected through a network based on the second identification information identified by the user identification part, said user identification part inquiring, when the first identification information is not stored in said first storage part, of said authentication device about the corresponding second identification information corresponding to the first identification information not stored in said first storage part; and
a second storage part configured to store identification information of said authentication device by associating with the first identification information,
wherein said authentication device is one of a plurality of authentication devices,
wherein said user identification part inquires of said authentication device, which is associated with the identification information associated in said second storage part, about the corresponding second identification information.

2. The information processing apparatus as claimed in claim 1,
wherein said second storage part is configured to store the identification information of said authentication device said authentication device by associating with a part of the first identification information.

3. The information processing apparatus as claimed in claim 1,
wherein said second storage part is configured to store the identification information of said authentication device by associating with the entire first identification information.

4. The information processing apparatus as claimed in claim 1, further comprising:
a registration part configured to receive an input of the second identification information when the second identification information corresponding to the first identification information is not identified by said user identification part, and register the second identification information in said first storage part by associating with the first identification information.

5. The information processing apparatus as claimed in claim 1,
wherein the first identification information is a card ID and the second identification information is user identification information.

6. An information processing method performed by a computer including a first storage part configured to store correspondence information between first identification information and second identification information, the information processing method comprising:
a user identification procedure that identifies the second identification information corresponding to the first identification information in response to an input of the first identification information;
an authentication request procedure that requests an authentication to an authentication device connected through a network based on the second identification information identified in the user identification procedure, said user identification procedure inquiring, when the first identification information is not stored in said first storage part, of said authentication device about the corresponding second identification information corresponding to the first identification information not stored in said first storage part, wherein said authentication device is one of a plurality of authentication devices, wherein said computer further includes a second storage part configured to store identification information of said authentication device by associating with the first identification information, wherein said user identification procedure inquires of said authentication device, which is associated with the identification information associated in said second storage part, about the corresponding second identification information.

7. The information processing method as claimed in claim 6, wherein said second storage part is configured to store the identification information of said authentication device by associating with a part of the first identification information.

8. The information processing method as claimed in claim 6, wherein said second storage part is configured to store the identification information of said authentication device by associating with the entire first identification information.

9. The information processing method as claimed in claim 6, further comprising:

a registration procedure that receives an input of the second identification information when the second identification information corresponding to the first identification information is not identified by said user identification procedure and registers the second identification information in said first storage part by associating with the first identification information.

10. The information processing method as claimed in claim 6, wherein the first identification information is a card ID and the second identification information is user identification information.

11. A non-transitory computer readable recording medium storing a program causing a computer to perform an information processing method, the computer including a first storage part configured to store correspondence information between first identification information and second identification information, the information processing method comprising:

a user identification procedure that identifies the second identification information corresponding to the first identification information in response to an input of the first identification information;

an authentication request procedure that requests an authentication to an authentication device connected through a network based on the second identification information identified in the user identification procedure, said user identification procedure inquiring, when the first identification information is not stored in said first storage part, of said authentication device about the corresponding second identification information corresponding to the first identification information not stored in said first storage part, wherein said authentication device is one of a plurality of authentication devices, wherein said computer further includes a second storage part configured to store identification information of said authentication device by associating with the first identification information, wherein said user identification procedure inquires of said authentication device, which is associated with the identification information associated in said second storage part, about the corresponding second identification information.

12. The non-transitory computer readable recording medium as claimed in claim 11, wherein said second storage part is configured to store the identification information of said authentication device by associating with a part of the first identification information.

13. The non-transitory computer readable recording medium as claimed in claim 11, wherein said second storage part is configured to store the identification information of said authentication device by associating with the entire first identification information.

14. The non-transitory computer readable recording medium as claimed in claim 11, wherein the information processing method further comprising:

a registration procedure that receives an input of the second identification information when the second identification information corresponding to the first identification information is not identified by said user identification procedure and registers the second identification information in said first storage part by associating with the first identification information.

15. The non-transitory computer readable recording medium as claimed in claim 11, wherein the first identification information is a card ID and the second identification information is user identification information.

* * * * *